Aug. 23, 1960     H. GUTTON ET AL     2,950,473
RADIOELECTRIC DISTANCE MEASURING SYSTEMS
Filed Feb. 2, 1954     3 Sheets-Sheet 1

United States Patent Office 2,950,473
Patented Aug. 23, 1960

2,950,473

RADIOELECTRIC DISTANCE MEASURING SYSTEMS

Henri Gutton and Henri Familier, Paris, France, assignors to Compagnie Generale de Telegraphie Sans Fil, a corporation of France Filed Feb. 2, 1954, Ser. No. 407,638

Claims priority, application France Feb. 4, 1953

4 Claims. (Cl. 343—6.5)

The present invention has for object to provide a radioelectric system by means of which the distance between two points, mobile or not with respect to each other, may be measured.

It is known to use for measuring this distance responder devices called beacons which cooperate with interrogator devices of the radar type.

Beacons of this type comprise a receiver which, on the reception of a signal emitted by the interrogator, puts a transmitter into action. This transmitter transmits a signal which is received by the interrogator and serves to measure the distance between the responder and the transmitter. Beacons are in particular used when the echo returned by a point is not powerful enough, or is liable to be masked, or it is desired to identify with precision a given point.

Under certain circumstances it is especially necessary to use simple and small responder beacons. This is particularly so when the responder beacon is placed on a mobile which moves at high speed that may be in the neighborhood of the speed of sound.

The invention has more particularly for object to provide an interrogator responder system which is especially suitable for this last application.

The interrogator of the system according to the invention comprises a transmitter-receiver device of the frequency modulated radar type.

The responder comprises a quenched transmitter.

More particularly the responder of the system according to the invention comprises a quenched oscillator substantially tuned to the carrier frequency of the frequency modulated transmitter of the interrogator and phase controlled by the signals transmitted by the latter.

The invention will be better understood with the aid of the ensuing description with reference to the appended drawings, wherein.

Figure 1:
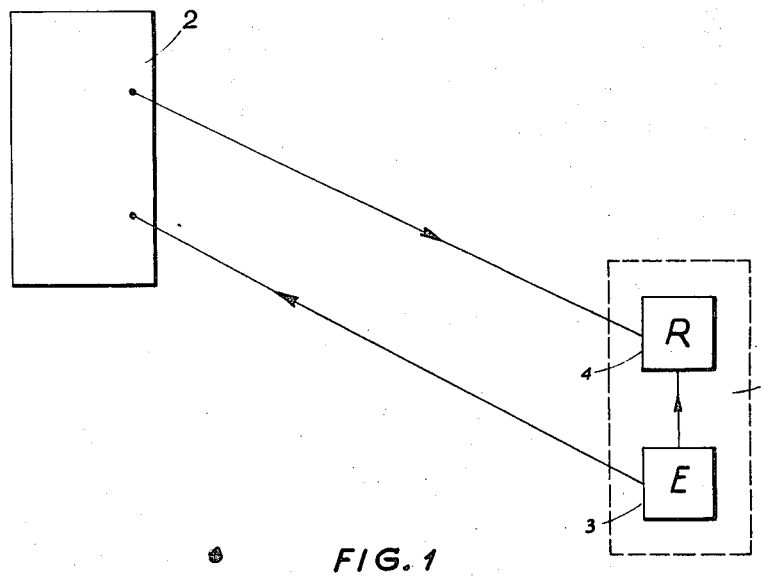
Fig. 1 shows a block diagram of the system according to the invention.
Figure 2:
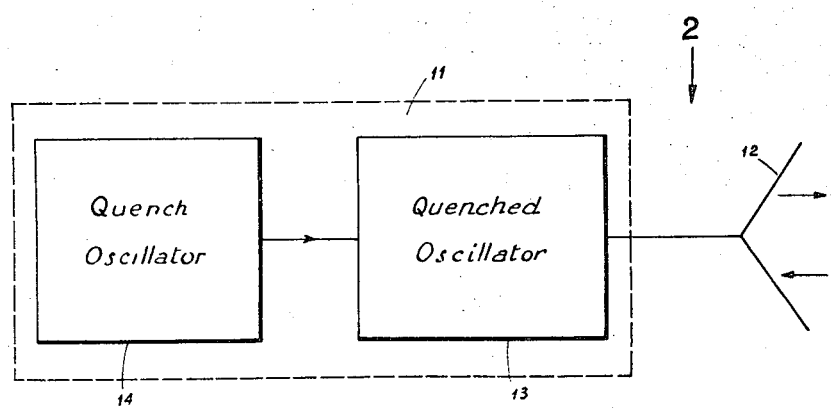
Fig. 2 shows a block diagram of the responder used in the system according to the invention.

As shown in Fig. 1, the system according to the invention comprises an interrogator 1 (Fig. 3), which is for example fixed, and a responder 2 (Fig. 2), for example mobile.

The interrogator 1, which is of the type of a frequency-modulated radar, comprises a frequency modulated transmitter 3 and a receiver 4. The transmitter 3 is provided with a transmitting antenna 5 and the receiver with a receiving antenna 6. The receiver includes a mixer 7 which receives the signal transmitted by the responder 2 and, furthermore, that emitted by the transmitter 3 of the interrogator 1. The output of the mixer 7 is connected to an amplifying stage 8 tuned to the quench frequency, referred to hereinafter, of the responder 2. The output of the amplifier 8 is connected to a detector 9 which detects the beat of two signals mixed in the mixer 7. At the output of the detector is connected a distance indicator 10.

All these elements are conventional and it is therefore unnecessary to describe them in detail.

Figure 4:
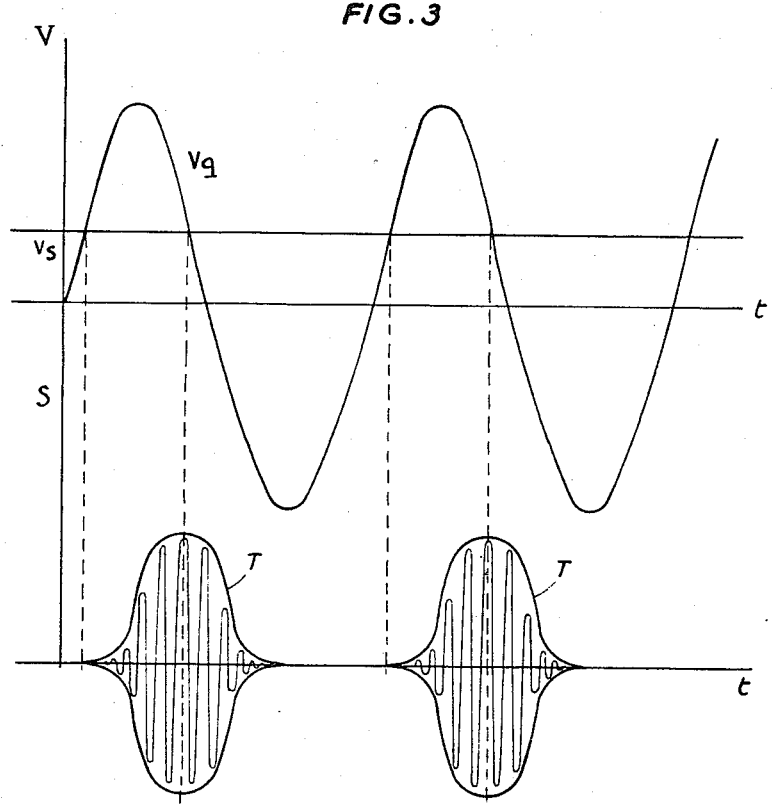
Fig. 4 shows the wave trains transmitted by the quenched oscillator.

The responder 2 is formed by a quenched oscillator 11 which is provided with a transmitting and receiving antenna 12. Quenched oscillators are well known. Briefly, a quenched oscillator consists of an oscillator 13, maintained below the oscillation threshold, and of a quench oscillator 14, the output voltage of which is applied to one of the electrodes of the oscillator 13 to trigger the same and cause it to oscillate. Thus, the oscillator 13 transmits wave trains at the frequency of the oscillator 14, or quench frequency, as shown in Fig. 4 wherein $V_q$ is the output voltage of the quench oscillator 14, $V_s$ the voltage corresponding to the oscillation threshold of the oscillator 13 and T the wave train transmitted by the responder.

When the interrogator 1 is in operation, the quenched oscillator receives the signal transmitted by the latter through the aerial 12.

The oscillator 13 may be of any type; it may be a magnetron, a reflex klystron or a triode oscillator.

Of course the oscillator 13 has to be tuned to the frequency of the carrier wave of the interrogator and the period of the frequency modulation of the interrogator 1 must be large compared with the quenching period.

Theory and practice show that when the responder 2 does not receive signals from the interrogator 1, the phase of the signal it emits is random.

However, as soon as the responder receives the signal transmitted by the interrogator, the oscillations transmitted by the responder are synchronized at the starting of the oscillation of the latter with the signal transmitted by the interrogator. The quenched oscillator continues then to oscillate on its own frequency. The interrogator signal is effective in achieving this result as soon as it is received by the responder with an amplitude about two or three times higher than the internal noise of the tube.

The system according to the invention operates, under these conditions, in the following manner:

As already stated the frequency modulated transmitter 5 of the interrogator 1 transmits a frequency modulated ultra-high frequency wave. The latter is received by the antenna 12 of the responder 2. Immediately, the signals, which are transmitted in the form of wave trains by the responder, acquire a fixed phase relative to the waves transmitted by the interrogator 1. These waves are received by the receiver antenna 6 of the interrogator 1 and are mixed in the mixer 7 with the signal transmitted by the transmitter 3.

Theory and practice show that the output signal from the mixer 7 (Fig. 3) is constituted by a wave which is quenched at the frequency of the quench oscillator 14 and is amplitude modulated by the beat of the interrogator signal and of the responder signal received by the antenna 6. At the output of the amplifier 8, tuned at the quenching frequency, there is collected a signal amplitude modulated by the beats. Said beats are collected at the output of the detector 9. Everything occurs as if, between mixer and detector, there was no amplifier, and if, in place of responder beacon, there was a passive target reflecting the wave transmitted by the transmitter of the interrogator. As a matter of fact, the quenched oscillator oscillates at its own carrier frequency. But each wave train is in phase with the received signal. This phase shifting of each wave train with respect to the preceding one has for consequence that everything occurs as if the output signal of detector 9 were the reflection of the received signal by the target. This output signal is amplified at 8 and detected at 9. The measuring and indicating apparatus 10 may be of the type of those employed in frequency modulated radars.

Figure 5:
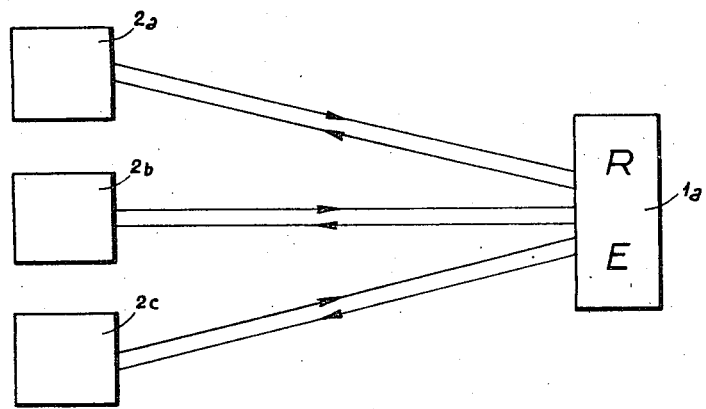
Fig. 5 shows a block diagram of a further embodiment of the system according to the invention.

According to another feature of the invention, a single interrogator $1_a$ can cooperate with a plurality of responders, for instance three responders $2_a$, $2_b$, $2_c$ as shown in Fig. 5.

The construction of the responders $2_a$, $2_b$, $2_c$ is the same as the construction of the responder 2 (Fig. 2), but each responder has a different quenching frequency.

Figure 6:
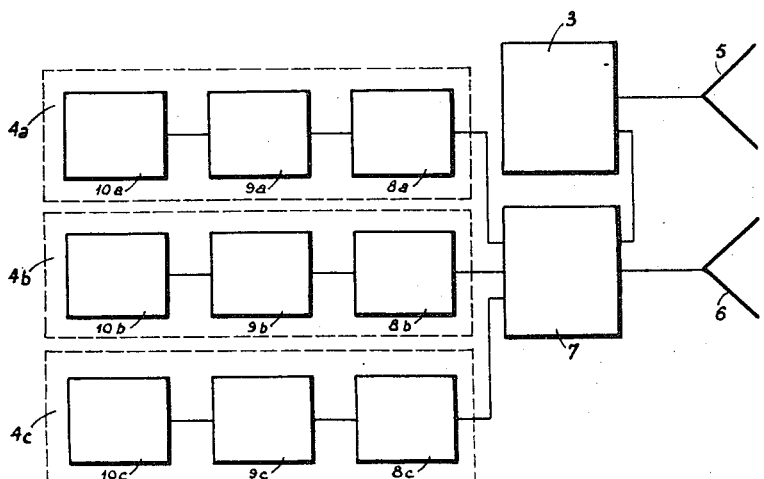
Fig. 6 shows the interrogator utilized in the system of Fig. 5.

The construction of the interrogator $1_a$ is shown in Fig. 6. The transmitter and the mixer are of the same structure as in Figure 3 and have therefore been designated by the same reference numbers.

The output of the mixer 7 (Fig. 6) is connected to three different stages $4_a$, $4_b$, $4_c$ which are all of the same structure. The three stages comprise respectively an amplifier $8_a$, $8_b$, $8_c$, feeding respectively a detector $9_a$, $9_b$, $9_c$, the output of which is connected to a distance indicator $10_a$, $10_b$, or $10_c$.

Figure 3:
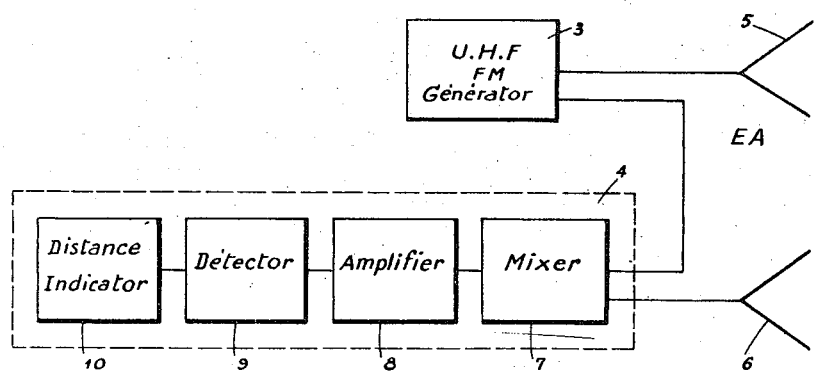
Fig. 3 shows a block diagram of the interrogator used in the same system.

The structure of the above elements is essentially the same in all three stages $4_a$, $4_b$ and $4_c$ and similar to the structure of the corresponding elements of the Fig. 3. However, the amplifiers $8_a$, $8_b$, $8_c$ are respectively tuned to the respective quenching frequencies of the responders $2_a$, $2_b$, $2_c$.

In this way the interrogator $1_a$ is capable of simultaneously cooperating with all these responders without one of them interfering with the operation of the others.

Moreover, as the amplifiers 8, $8_a$, $8_b$ and $8_c$ are tuned to the quench frequency of the corresponding responder, any interference by an extraneous signal or noise is avoided.

As has been mentioned above, the invention is particularly suitable for mobile objects travelling at high speed. Under these conditions, the responder 2 is placed on board the mobile object and is advantageously provided with a triode quench oscillator.

Figure 7:
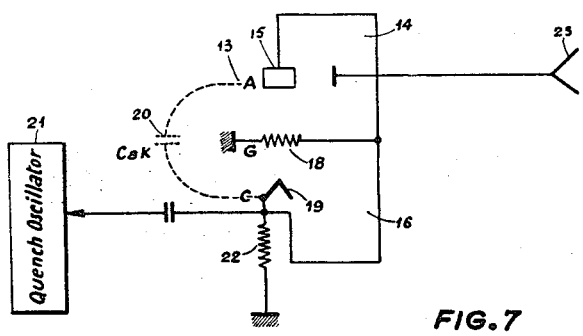
Fig. 7 shows a particular embodiment of the responder of the invention.

Such an oscillator is diagrammatically shown in Fig. 7.

In this figure there can be seen an ultra-high frequency triode 13. A cavity resonator 14, tuned to the frequency of the carrier wave transmitted by the interrogator 1, is coupled between the anode 15 and the grid 18 and, furthermore, a cavity resonator 16 is coupled between the grid 18 and the cathode 19. The regenerative coupling is obtained by the anode-cathode capacity 20. The quench oscillator 21 is connected to the cathode 19 and the transmitting-receiving antenna 23 to the cavity resonator 14. The cathode 19 is earthed through a bias resistor 22.

What we claim is:

1. A system for measuring the distance between a first and a second point and for identifying at said first point said second point comprising: at said first point an interrogator including means for emitting a first frequency modulated ultra-high frequency signal; at said second point a responder beacon including: a quenched oscillator comprising an ultra-high frequency oscillator and a quench oscillator for quenching said oscillator at a predetermined frequency, means for receiving said first signal for locking said oscillator frequency to said first signal frequency and means for radiating second signals generated by said quench oscillator; at said first point: means for receiving said second signals, means for mixing said first and second signals, amplifying means, tuned to the quench frequency of said responder beacon, for amplifying the beat frequency signal of said mixing means; means for detecting the beat frequency signal provided by said mixing means and amplified by said amplifying means; and means for measuring the frequency of said beat frequency signal.

2. A system according to claim 1 wherein the frequency deviation period of said first signal is large compared to the period of said quench oscillator.

3. A system for simultaneously measuring the respective distances between a first point and a plurality of second points and for identifying, at said first point, said second points, comprising, at said first point, an interrogator including means for emitting a first frequency modulated ultra-high frequency signal; at each of said second points, a responder beacon including a quenched oscillator, of the type comprising an ultra-high frequency oscillator, all said oscillators having substantially the same frequency as the carrier wave of said interrogator and a quench oscillator for quenching said ultra-high frequency oscillator at a predetermined frequency which is different for each responder; means for receiving said first signal for locking said oscillator frequency to said first signal frequency and means for radiating the signal generated by said quenched oscillator; means for receiving said responder signals; a plurality of mixing means for mixing respectively said first and responder signals; means for detecting the beat frequency signals respectively provided by said mixing means; amplifying means respectively tuned to the respective quenching frequencies of said responders for amplifying the respective beat frequency signals between said first signal and said responder signal; and means for measuring the respective frequencies of said beat frequency signals respectively amplified by said amplifying means.

4. A system according to claim 3, wherein the frequency deviation period of said first signal is large compared to the respective periods of said quench oscillators.

References Cited in the file of this patent

UNITED STATES PATENTS

| | | |
|---|---|---|
| 2,183,562 | Hansell | Dec. 19, 1939 |
| 2,229,078 | Hansell | Jan. 21, 1941 |
| 2,262,838 | Deloraine et al. | Nov. 18, 1941 |
| 2,301,929 | Budenbom | Nov. 17, 1942 |
| 2,363,571 | Chaffee | Nov. 28, 1944 |
| 2,524,495 | Taylor et al. | Oct. 3, 1950 |
| 2,604,621 | Earp et al. | July 22, 1952 |
| 2,786,996 | Todd | Mar. 26, 1957 |